2,990,234
PRODUCTION OF STRONG, ROT-RESISTANT BENZYL CELLULOSE FIBERS

Elias Klein, Mobile, Ala., and David J. Stanonis and Pieter Harbrink, New Orleans, La., assignors to the United States of America as represented by the Secretary of Agriculture
No Drawing. Filed Mar. 13, 1959, Ser. No. 799,390
6 Claims. (Cl. 8—120)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to an improved method for the benzylation of cellulose. More particularly, this invention provides an improved process for the production of strong, rot-resistant benzyl cellulose fibers.

The conventional practice in the preparation of cellulose ethers, such as benzyl cellulose, has been to steep the cellulose in strong caustic solution, press out the excess caustic, and then treat the alkali cellulose so formed with the etherifying agent. The etherifying agent commonly used for benzylation of cellulose is benzyl chloride. When benzyl chloride is employed to etherify a single hydroxyl group of cellulose, the overall reaction is as follows:

$$\text{Cell(OH)}_3 + \text{NaOH} + \text{C}_6\text{H}_5\text{CH}_2\text{Cl}$$
$$\rightarrow \text{Cell(OH)}_2\text{OCH}_2\text{C}_6\text{H}_5 + \text{NaCl} + \text{H}_2\text{O}$$

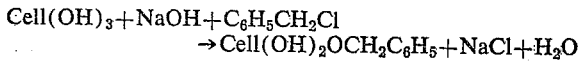

By consecutive reactions of the other hydroxyl groups of the cellulose, the process can theoretically be continued until a degree of substitution (D.S.) of 3.0 is reached.

The use of low concentrations of caustic and low reaction temperatures in conventional benzylation processes results in the production of benzyl cellulose with a relatively low degree of substitution. It is generally necessary to employ repeated etherification treatments, or to use high concentrations of caustic in conjunction with high reaction temperatures and extended reaction periods, to produce benzyl cellulose having a relatively high degree of substitution. The benzyl cellulose prepared under these rather drastic reaction conditions either loses its fibrous characteristics, or if it remains in fibrous form the fibers are weak due to the increased degradation of the cellulose. This degradation is particularly detrimental in cases where the object of the benzylation is to produce a fibrous ether with high tensile strength, yet having a relatively high degree of substitution which confers to the cellulose desirable properties such as microbiological resistance.

We have discovered a method for preparation of benzyl cellulose with a relatively high degree of substitution without loss of tensile strength of the cellulose. An additional advantage of our improved method is that a degree of substitution is achieved which is approximately twice as large as that obtained using a conventional benzylation procedure without the improvements of the present invention.

We have found that the use of a rather specific concentration of a lower monohydric aliphatic alcohol in the aqueous sodium hydroxide-benzyl chloride mixture employed for benzylation of cellulose results in much more efficient benzylation and at the same time provides protection against degradation of the cellulose, so that there is a retention or improvement in tensile strength of the cellulosic fibers. The alcohols apparently facilitate the benzylation reaction through their effect on the composition of the aqueous phase about the cellulose. The alcohols give the beneficial effects of increasing the solubility of the benzyl chloride in the aqueous phase, and changing the cellulose-alkali cellulose equilibria and the swelling power of the aqueous phase. The alcohol particularly preferred in the process of this invention is ethyl alcohol. The optimum amount of ethyl alcohol to use in the reaction mixture of the process of this invention ranges from about 126% to 189% by weight of the cellulose present. When quantities of alcohol below this amount are employed, fibers having lower degrees of substitution and lower tensile strength are obtained. Other lower monohydric aliphatic alcohols, such as methanol, n-propanol, isopropanol, and the like may also be used. It is generally preferred to use about 2 moles of alkali, preferably sodium hydroxide, for each mole of anhydroglucose units of the cellulose etherified by the process of the present invention. This amount of alkali, in conjunction with the previously described optimum concentration of alcohol, in the benzylation mixture, yields a strong, fibrous benzyl cellulose of a sufficiently high degree of substitution to be resistant to microbiological degradation. Quantities of alkali greatly in excess of this amount are not generally desirable where strength retention of the fibers is wanted. Somewhat less than 2 moles of alkali per mole of anhydroglucose may be used, providing the amount is sufficient to form adequate amounts of alkali cellulose for reacting with the etherifying agent to produce a product with the desired degree of substitution.

The amount of etherifying agent used may vary within wide limits. However, it is generally preferred to use a large excess of the etherifying agent. About 10 to 25 moles of benzyl chloride is usually preferred for each mole of anhydroglucose units of the cellulose treated by the process of this invention. The etherifying agent serves not only as a reactant, but also as a liquid medium for immersing the cellulosic material undergoing etherification. It is not generally advantageous to replace the excess etherifying agent with an indifferent organic solvent or diluent, since the speed and extent of etherification will generally be lower than when an excess of the etherifying agent is employed.

The time and temperature of the benzylation reaction can be varied to some extent by the operator, depending on the reaction speed and degree of substitution of the product desired. It will be found that the higher the temperature the more rapid will be the reaction. Temperatures below about 90° C. are too low to give sufficiently rapid reaction in the process of this invention. Temperatures up to about 115° C. or higher can be used, but the strength of the fibrous benzyl cellulose so produced is lowered to some extent. We generally like to carry out the reaction at a temperature of about 95° C. for a period of about 2 hours for fibers and about 4 hours for fabrics. The fibrous benzyl cellulose produced under these preferred conditions has a degree of substitution (D.S.) of about 0.4 to 0.5, retains full tensile strength, is insoluble in the common organic solvents, and has outstanding rot-resistance properties making it useful in various textile applications. In addition, these fibrous benzyl celluloses exhibit a high degree of thermoplasticity, substantivity to disperse dyes, increased elastic recovery, and decreased permanent set. Superior durably creaseproofed fabrics can be made from these fibrous ethers because of their properties of thermoplasticity and decreased permanent set, and their stable ether structure. Microscopic and X-ray examinations of the fibrous benzyl cellulose produced by the process of this invention indicate that the chemical modification of the cellulose is essentially homogeneous. This homogeneity is achieved by the increased solubility of etherifying agent in the aqueous phase, and changes in the cellulose-alkali cellulose equilibria and the swelling power of the aqueous phase brought about by the improvements of the present invention.

Substantially any type of cellulosic fibers containing cellulose hydroxyl groups can be benzylated by the process of this invention. The natural vegetable textile fibers, such as cotton fiber and ramie, are particularly suitable for use in the process of this invention. The fibers can be treated in the form of free fibers, sliver, yarn, thread or fabric. The fibers used can be mercerized or unmercerized. It is generally preferred to employ mercerized fibers.

The benzylation reaction is preferably carried out in a reaction vessel provided with an air condenser or other suitable means of condensing vapors evolved from the reaction mixture, such that the proper reaction temperature is maintained in the reaction vessel. It is also desirable to have some means of stirring or shaking the reactants during the reaction to assure adequate mixing and contact. When treating mercerized cellulosic fibers the components of the benzylation mixture may be introduced into the reaction vessel simultaneously or in any order or combination. As a general procedure, or when treating unmercerized cellulosic fibers, we prefer to mix the aqueous alkali and the alcohol, add the cellulosic material, and then add the benzyl chloride prior to heating the reaction mixture.

It is possible to employ the process of this invention to repeat the benzylation of a previously benzylated cellulosic material to achieve higher degrees of substitution without significant loss of tensile strength. This is not generally necessary, or desirable, since a D.S. of about 0.4 to 0.5 is adequate for most purposes and this D.S. can usually be achieved in a single benzylation treatment.

The following examples are given by way of illustration and not by way of limitation of this invention.

*Example 1*

To 2.2 ml. of 23% (by weight) aqueous sodium hydroxide solution was added 1.25 g. of cotton fibers in the form of commercially mercerized linker yarn (7/2). Twenty ml. (22 g.) of benzyl chloride was added, the reaction vessel was provided with a short spiral air condenser, and the reaction mixture was heated in an oil bath at 95° C. for 2 hours with continuous shaking. The yarn was washed with several portions of methanol, dilute nitric acid, and water, in succession, to remove excess reagents. After the last water washing, any residual benzyl chloride remaining in the yarn was removed by steam distillation until no odor was detected. The treated yarn was air-dried at room conditions. The weight of the air-dried yarn was 1.45 g., corresponding to 16.0% weight gain. The degree of substitution (D.S.) of the yarn was 0.28. It retained only 47% of the tensile strength of the untreated control yarn, as determined by the conventional method.

*Example 2*

To a solution made by mixing 2.2 ml. of 23% aqueous sodium hydroxide and 0.5 ml. of absolute ethyl alcohol (32% by weight of the yarn) was added 1.25 g. of cotton fibers in the form of commercially mercerized linker yarn (7/2). The yarn was then treated with benzyl chloride and processed in exactly the same manner as described in Example 1. The weight of the air-dried treated yarn was 1.43 g., corresponding to 14.4% weight gain. The degree of substitution of the yarn was 0.26. It retained 65% of the tensile strength of the untreated control yarn.

*Example 3*

1.25 g. of mercerized cotton linker yarn (7/2) was subjected to the same treatment outlined in Example 2 with the exception that a total of 1 ml. of absolute ethyl alcohol (63% by weight of the yarn) was used in the reaction mixture. The weight of the air-dried treated yarn was 1.52 g., corresponding to 21.6% weight gain. The degree of substitution of the yarn was 0.38. It retained 85% of the tensile strength of the untreated control yarn.

*Example 4*

1.25 g. of mercerized cotton linker yarn (7/2) was subjected to the same treatment outlined in Example 2 with the exception that a total of 1.5 ml. of absolute ethyl alcohol (95% by weight of the yarn) was used in the reaction mixture. The weight of the air-dried treated yarn was 1.523 g., corresponding to 21.8% weight gain. The degree of substitution of the yarn was 0.39. It retained 77% of the tensile strength of the untreated control yarn.

*Example 5*

1.25 g. of mercerized cotton linker yarn (7/2) was subjected to the same treatment outlined in Example 2 with the exception that a total of 2 ml. of absolute ethyl alcohol (126% by weight of the yarn) was used in the reaction mixture. The weight of the air-dried treated yarn was 1.63 g., corresponding to 30.4% weight gain. The degree of substitution (D.S.) of the yarn was 0.54, almost double the D.S. of the yarn of Example 1. The yarn of the present example retained its general physical appearance and fibrous form, except for some swelling of the fibers, and also retained 100% of the tensile strength of the untreated control yarn. It was insoluble in the common organic solvents, such as acetone, benzene and chloroform.

The treated yarn exhibited outstanding rot-resistance properties. It was intact, retaining its fibrous form, and retained 100% of its strength after 168 days of soil burial in the conventional test procedure. The untreated control yarn decomposed in 8 days in the same soil burial test.

*Example 6*

1.25 g. of mercerized cotton linker yarn (7/2) was subjected to the same treatment outlined in Example 2 with the exception that a total of 3 ml. of absolute ethyl alcohol (189% by weight of the yarn) was used in the reaction mixture. The weight of the air-dried treated yarn was 1.59 g., corresponding to 27.2% weight gain. The degree of substitution of the yarn was 0.48. The treated yarn retained its general physical appearance and fibrous form, except for some swelling of the fibers, and showed a fifteen percent increase in tensile strength as compared with the untreated control yarn.

*Example 7*

1.25 g. of mercerized cotton linker yarn (7/2) was subjected to the same treatment outlined in Example 2 with the exception that a total of 4 ml. of absolute ethyl alcohol (252% by weight of the yarn) was used in the reaction mixture. The weight of the air-dried treated yarn was 1.60 g., corresponding to 28.0% weight gain. The degree of substitution of the yarn was 0.49. It retained 79% of the tensile strength of the untreated control yarn.

*Example 8*

1.25 g. of unmercerized cotton sheeting (80 x 80) was subjected to the same treatment used for the yarn in Example 5, except that the total reaction time was 4 hours at 95° C. The weight of the air-dried treated fabric was 1.513 g., corresponding to 21.0% weight gain. The degree of substitution of the fabric was 0.37. It retained 90% of the tensile strength of the untreated control sheeting.

*Example 9*

1.25 g. of mercerized ramie fibers was subjected to the same treatment used for the yarn in Example 5. The weight of the air-dried treated ramie fibers was 1.53 g., corresponding to 23.0% weight gain. The degree of substitution of the fibers was 0.41.

*Example 10*

1.25 g. of mercerized ramie yarn was subjected to the same treatment used for the yarn in Example 5. The weight of the air-dried treated ramie yarn was 1.35 g., corresponding to 8% weight gain. The degree of substitution of the yarn was 0.14. It retained 90% of the tensile strength of the untreated control yarn.

We claim:

1. A process for the production of fibrous benzyl cellulose exhibiting high tensile strength and rot resistance comprising reacting cellulose with benzyl chloride and an alkali, in the presence of an amount of a lower monohydric aliphatic alcohol ranging from about 126% to 189% by weight of the cellulose.

2. The process of claim 1 in which the lower monohydric aliphatic alcohol is ethyl alcohol.

3. A process for the production of fibrous benzyl cellulose exhibiting high tensile strength and rot-resistance comprising reacting a natural vegetable textile fiber with benzyl chloride and an alkali, in the presence of an amount of a lower monohydric aliphatic alcohol ranging from about 126% to 189% by weight of said textile fiber.

4. The process of claim 3 in which the natural vegetable textile fiber is cotton.

5. The process of claim 3 in which the natural vegetable textile fiber is ramie.

6. A process for the production of fibrous benzyl cellulose exhibiting high tensile strength and rot-resistance comprising reacting at a temperature of about 95° C. for at least about 2 hours a natural vegetable textile fiber selected from the group consisting of cotton and ramie with an excess of benzyl chloride and with about 2 moles of aqueous sodium hydroxide for each mole of anhydroglucose unit of the cellulose of said textile fiber, in the presence of an amount of ethyl alcohol ranging from about 126% to 189% by weight of said textile fiber.

References Cited in the file of this patent

UNITED STATES PATENTS

| | | |
|---|---|---|
| 1,800,944 | Lilienfeld | Apr. 14, 1931 |
| 1,824,671 | Karrer et al. | Sept. 22, 1931 |
| 1,895,298 | Stocker | Jan. 24, 1933 |

FOREIGN PATENTS

| | | |
|---|---|---|
| 665 | Australia | Feb. 10, 1931 |
| 478,259 | Great Britain | Jan. 17, 1938 |